US 7,886,287 B1

(12) United States Patent
Davda (10) Patent No.: US 7,886,287 B1
(45) Date of Patent: Feb. 8, 2011

(54) METHOD AND APPARATUS FOR HOT UPDATING OF RUNNING PROCESSES

(75) Inventor: Bhavesh P. Davda, Westminster, CO (US)

(73) Assignee: Avaya Inc., Basking Ridge, NJ (US)

(*) Notice: Subject to any disclaimer, the term of this patent is extended or adjusted under 35 U.S.C. 154(b) by 2244 days.

(21) Appl. No.: 10/650,257

(22) Filed: Aug. 27, 2003

(51) Int. Cl.
G06F 9/44 (2006.01)
G06F 9/26 (2006.01)
(52) U.S. Cl. ..................... 717/168; 711/200
(58) Field of Classification Search .......... None
See application file for complete search history.

(56) References Cited

U.S. PATENT DOCUMENTS

| 4,755,995 | A | | 7/1988 | Anderson et al. ........... 371/9 |
| 5,619,698 | A | * | 4/1997 | Lillich et al. ............. 717/168 |
| 6,490,721 | B1 | * | 12/2002 | Gorshkov et al. ........... 717/130 |
| 7,039,776 | B2 | * | 5/2006 | Wong et al. ............... 711/159 |
| 2002/0152455 | A1 | * | 10/2002 | Hundt et al. .............. 717/131 |
| 2003/0084434 | A1 | * | 5/2003 | Ren ....................... 717/172 |
| 2003/0167463 | A1 | * | 9/2003 | Munsil et al. ............. 717/170 |
| 2004/0107416 | A1 | * | 6/2004 | Buban et al. .............. 717/170 |

* cited by examiner

Primary Examiner—Tuan Q Dam
Assistant Examiner—Zheng Wei
(74) Attorney, Agent, or Firm—Sheridan Ross P.C.

(57) ABSTRACT

The present invention is directed to a method and apparatus for updating running processes. In particular, a jump instruction is injected into the first instruction line of a function that has been updated. The jump instruction redirects the program to a location within a jump table containing the address of the first instruction of an updated function. Injection of the jump instruction can be made without stopping execution of the application, thereby allowing a patch to be installed without interrupting application services.

6 Claims, 6 Drawing Sheets

METHOD AND APPARATUS FOR HOT UPDATING OF RUNNING PROCESSES

FIELD OF THE INVENTION

The present invention is related to updating running processes. In particular, the present invention is directed to updating running software applications, without requiring that the application be brought down.

BACKGROUND OF THE INVENTION

Application program code is often updated, in order to incorporate new features or fix bugs that are identified after the code has been released. However, because patching a software application requires the replacement of program code, it has not been possible to update a running application. Instead, applications must be stopped, and the patch applied to the stored version of the program.

In order to patch running operating systems, various tools have been developed. For example, Avaya Inc. has a system for patching an operating system by implementing a shared library that is mapped in the process address space by the operating system kernel. The assembly code for the system is modified at function entry points to jump to updated functions in a shared library. However, this hot patching capability requires maintaining complex tools for creating the shared library and modifying the assembly code using the operating system kernel. Accordingly, such hot patching implementations are non-portable and proprietary. In addition, they are incapable of hot patching a running application.

The Solaris™ operating system available from Sun Microsystems™ provides some hot patching capability with respect to the operating system. In particular, the operating system is believed capable of unloading and reloading a patched module in a running system, without requiring that the system be rebooted. However, only the operating system kernel or device drivers can be patched using this system. Accordingly, running applications cannot be patched.

SUMMARY OF THE INVENTION

The present invention is directed to solving these and other problems and disadvantages of the prior art. According to an embodiment of the present invention, running applications, for example web servers, database systems, and call processing servers, can be updated without taking down a running application. According to the present invention, the running process includes an executable code text that allocates first memory space that is operable to receive new program instructions. In addition, the executable program code text allocates second memory space that is operable to receive address information related to new program instructions. As part of a patch operation, execution of the program code is momentarily stopped, and a jump instruction is injected at a location in memory containing a first instruction of a first replaced function. In particular, the jump instruction directs the running application to an address within a jump table in the second memory space. The location at the address within the jump table contains the address of the first instruction of an updated function. Thus, the running application is directed to the updated function, which is executed in place of the replaced function.

In accordance with another embodiment of the present invention, a linker script program is provided to reserve memory for an update or jump table. In addition, the linker script reserves a section of memory for the text of new or updated functions. In addition, a create patch tool receives information identifying the executable or application to be patched. The create patch tool also receives information comprising a patched version identifier, and the identity of the function to be replaced. The create patch tool opens the identified executable, and obtains addresses for the update table, function to be replaced, and new function, from a symbol table. The addresses thus obtained are then written to a configuration file. A signal handler determines the location of the running executable, and opens the running executable's file. The location of the text segment or code of the running executable is then determined, and the address range of the text of the new function is mapped to the executable for insertion in the jump table.

In order to install the patched function, the configuration file is read into memory, and the signal handler embedded in the executable is invoked, remapping the virtual address range to the updated executable. A debugger is then invoked to halt the process, and the position of the instruction pointer is determined. If the instruction pointer is within a predetermined number of bytes from the function to be patched, the debugger is again invoked. If the instruction pointer is not within the predetermined number of bytes from the function to be patched, an update table is populated with the address of the new or updated function. A jump instruction is then injected for the old function followed by the address of the update table entry for the new function. The debugger is then detached and the process is resumed. Accordingly, the version of an application or process running in memory is updated. In order to update a stored copy of an application or process, the executable in storage is replaced with the updated executable.

DETAILED DESCRIPTION

Figure 1:
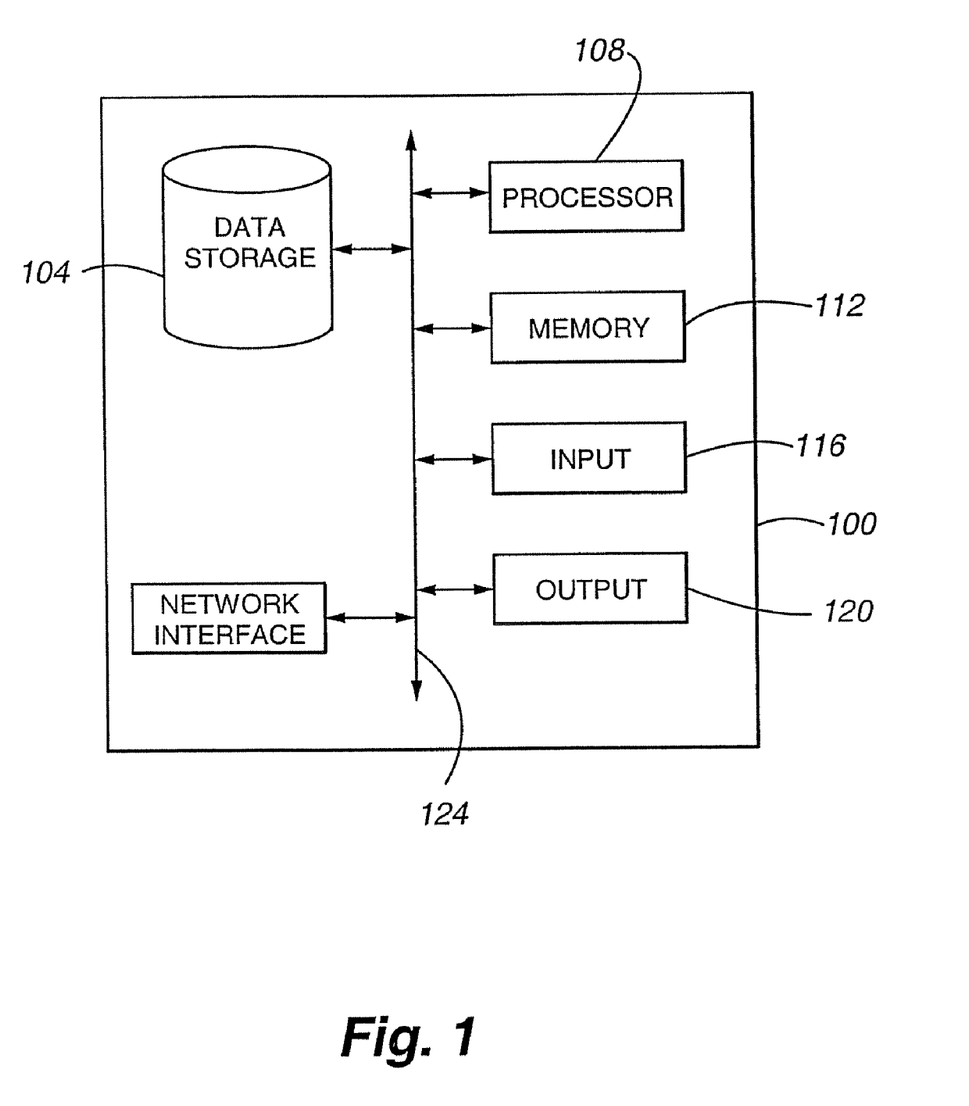
FIG. 1 is a block diagram of a general purpose computer capable of running software that can be updated in accordance with embodiments of the present invention.

FIG. 1 is a block diagram of a general purpose computer 100 capable of running software that can be updated in accordance with embodiments of the present invention. In general, data storage 104 may be provided for storing operating instructions and/or data. In particular, the data storage 104 may provide storage for applications, including executable programs that can be updated while running in accordance with the present invention. The data storage 104 may include magnetic storage devices, solid state storage devices, optical storage devices, logic circuits, or any combination of such devices. A processor 108 capable of running executable programs stored in the data storage 104 may comprise a general purpose, programmable processor or digital signal processor. Memory 112 is provided for use in connection with the running of executable programs by the processor 108. The memory 112 may comprise solid state memory, such as RAM, DRAM or SDRAM. In addition, the computer 100 may include various input 116 and output 120 devices. For example, the input 116 may include a keyboard and a pointing device, such as a mouse. The output 120 may include a display, for example a cathode ray tube, liquid crystal display, plasma display, or other image display device. A communication bus 124 permits the exchange of data between the various components of the computer 100.

Figure 2:
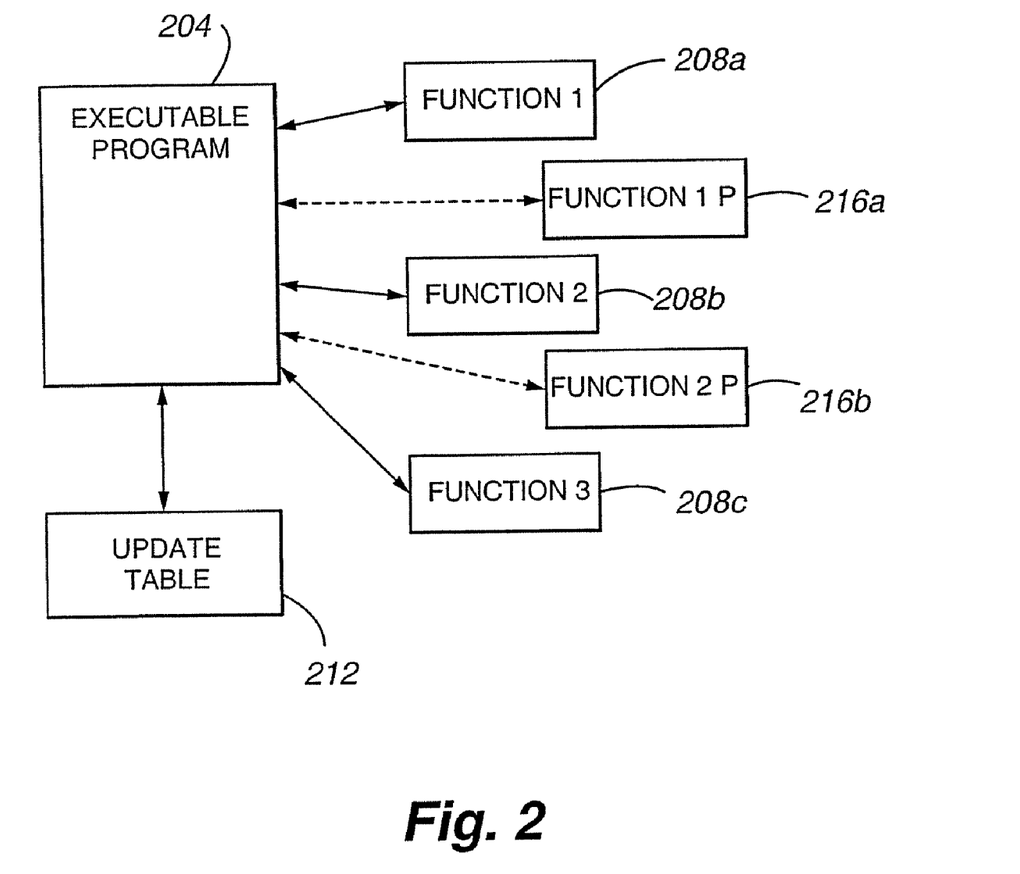
FIG. 2 is functional block diagram illustrating aspects of software in accordance with embodiments of the present invention.

FIG. 2 is a block diagram illustrating aspects of software in accordance with embodiments of the present invention. In particular, an executable program 204 may be linked to one or more functions 208. As can be appreciated by one of skill in the art, each function 208 may be called during execution of the executable program 204. As can further be appreciated by one of skill in the art, a running executable program 204 generally performs steps set forth in object code. Furthermore, a step of calling a function 208 during execution of the executable program 204 may comprise directing the computer 100 to execute code contained at a particular memory address. As is described in greater detail elsewhere in this disclosure, by substituting an instruction directing the computer 100 to a memory address comprising an update table 212 in place of the first instruction of a function 208 that is being replaced, the executable program 204 may be directed to an updated function 216. In particular, the location within the update table 212 to which the computer 100 is directed in place of the first instruction of a function 208 may contain an instruction to jump to a memory address containing the appropriate updated function 216. Therefore, by replacing a first instruction associated with a function 208 with an instruction to execute a further instruction contained within an update table 212, a function 208 can be replaced by an updated function 216.

Figure 3:
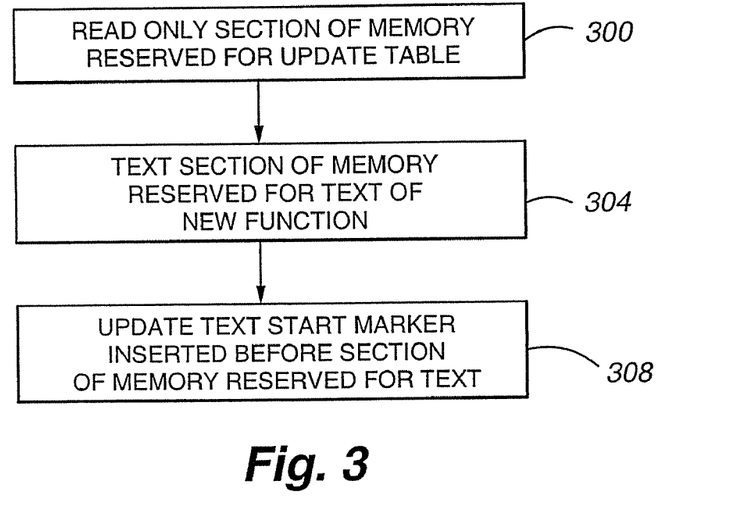
FIG. 3 is flow chart illustrating steps taken in connection with preparing an executable to be updated in accordance with an embodiment of the present invention.

FIG. 3 is a flow chart illustrating steps taken to prepare an executable to be updated in accordance with an embodiment of the present invention. Initially, a read-only section of memory 112 is reserved for the update table 212 (step 300). Next, a text section of memory 112 is reserved for receiving the text of the new or updated function 216 (step 304). Then, an update text start marker is inserted within the object code of the executable 204 prior to the section of memory 112 reserved for text (step 308). These functions may be performed in connection with the operation of a linker script program. In particular, such steps may be taken automatically as part of linking an executable, and prior to running of the executable.

Figure 4:
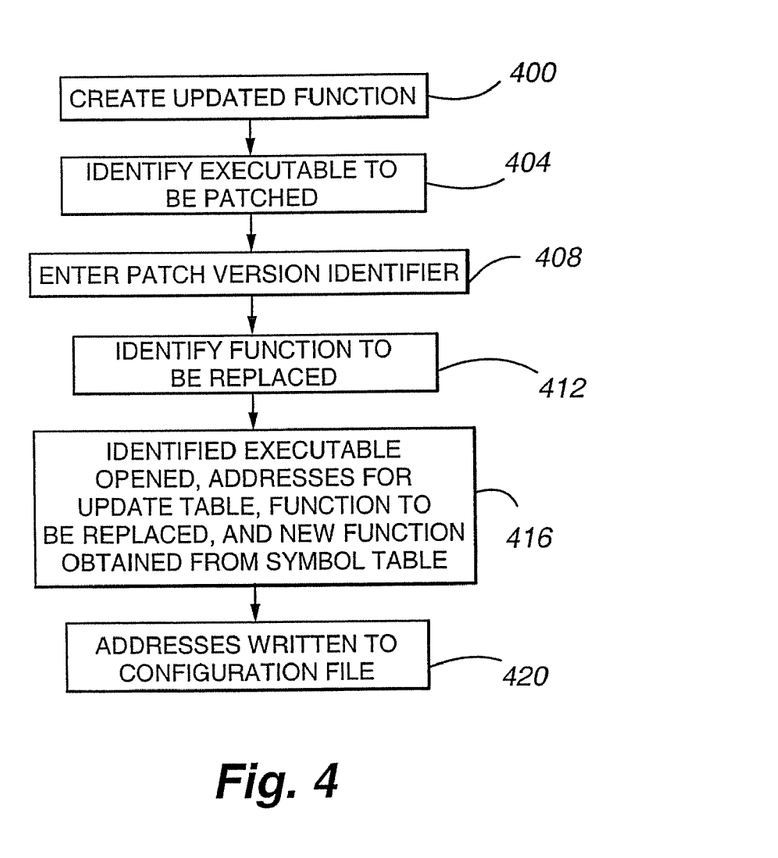
FIG. 4 is a flow chart illustrating various pre-installation steps performed prior to updating an executable in accordance with an embodiment of the present invention.

FIG. 4 illustrates various preinstallation steps performed prior to updating an executable. Thus, at step 400, the updated function or functions are created (e.g., function 1P 216a). At step 404, the executable 204 to be patched is identified. For example, the executable 204 may be identified by file name. At step 408, a patch version identifier is entered. In general, any symbol may be chosen for identifying the patch version number. For example, a first patch version may use the symbol "P."

At step 412, the function (e.g., function 208a) to be replaced is identified. Next, the identified executable 204 is opened, and the addresses for the update table 212, function to be replaced 208, and new function 216 are obtained from the symbol table (step 416). The addresses are then written to a configuration file (step 420). In general, the configuration file may contain an update or jump table 212 address for each updated function 216, the original function name 208, the address of the original function 208, the new or updated function 216 name, and the address of the new function 216.

Figure 5:
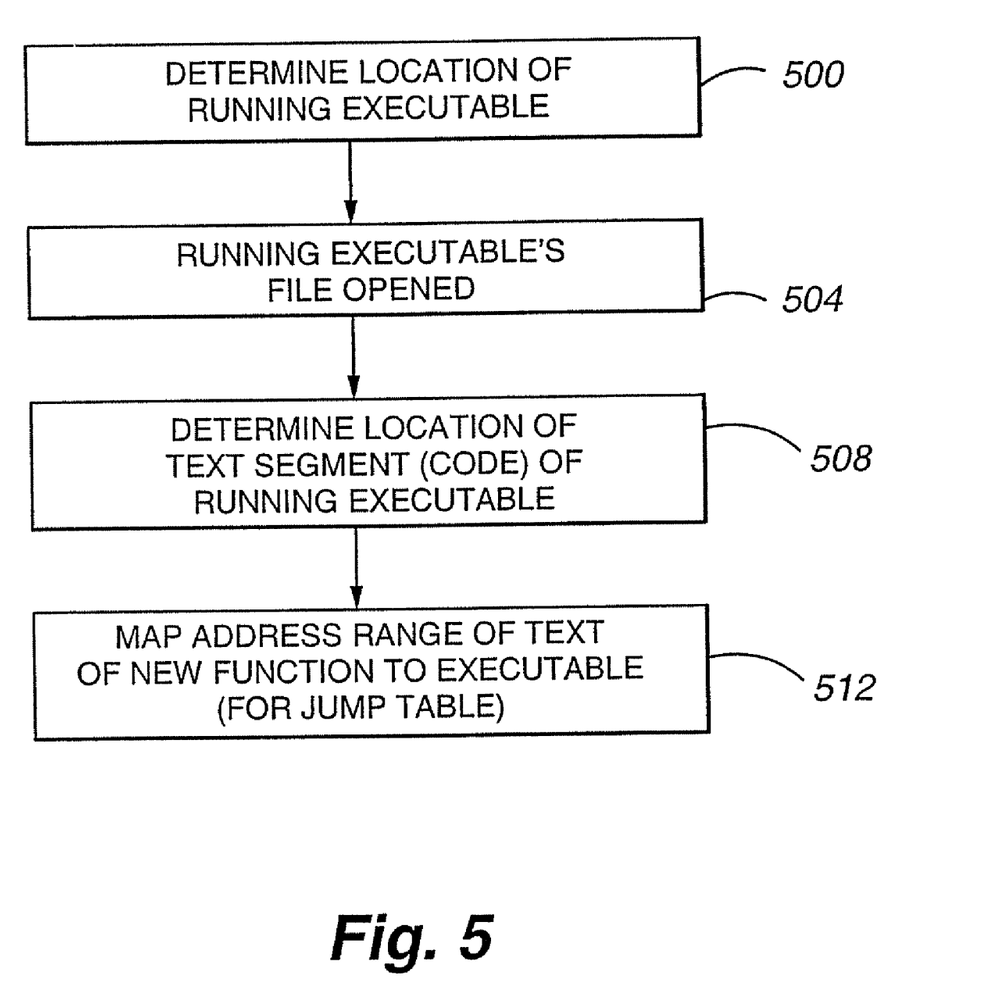
FIG. 5 is a flow chart illustrating a signal handler function in accordance with an embodiment of the present invention.

FIG. 5 illustrates the signal handler function. In particular, FIG. 5 illustrates steps taken to prepare a running executable to be patched. Initially, at step 500, the location of the running executable 204 in memory 112 is determined. The running executable's file is then opened (step 504). Next, the location in memory 112 of the text segment or code of the running executable 204 is determined (step 508). The address range of the text of the new function 216 is then mapped to the executable (step 512). Mapping the address range of the new function to the executable allows the appropriate memory addresses to be determined for inclusion in the update or jump table 212.

Figure 6:
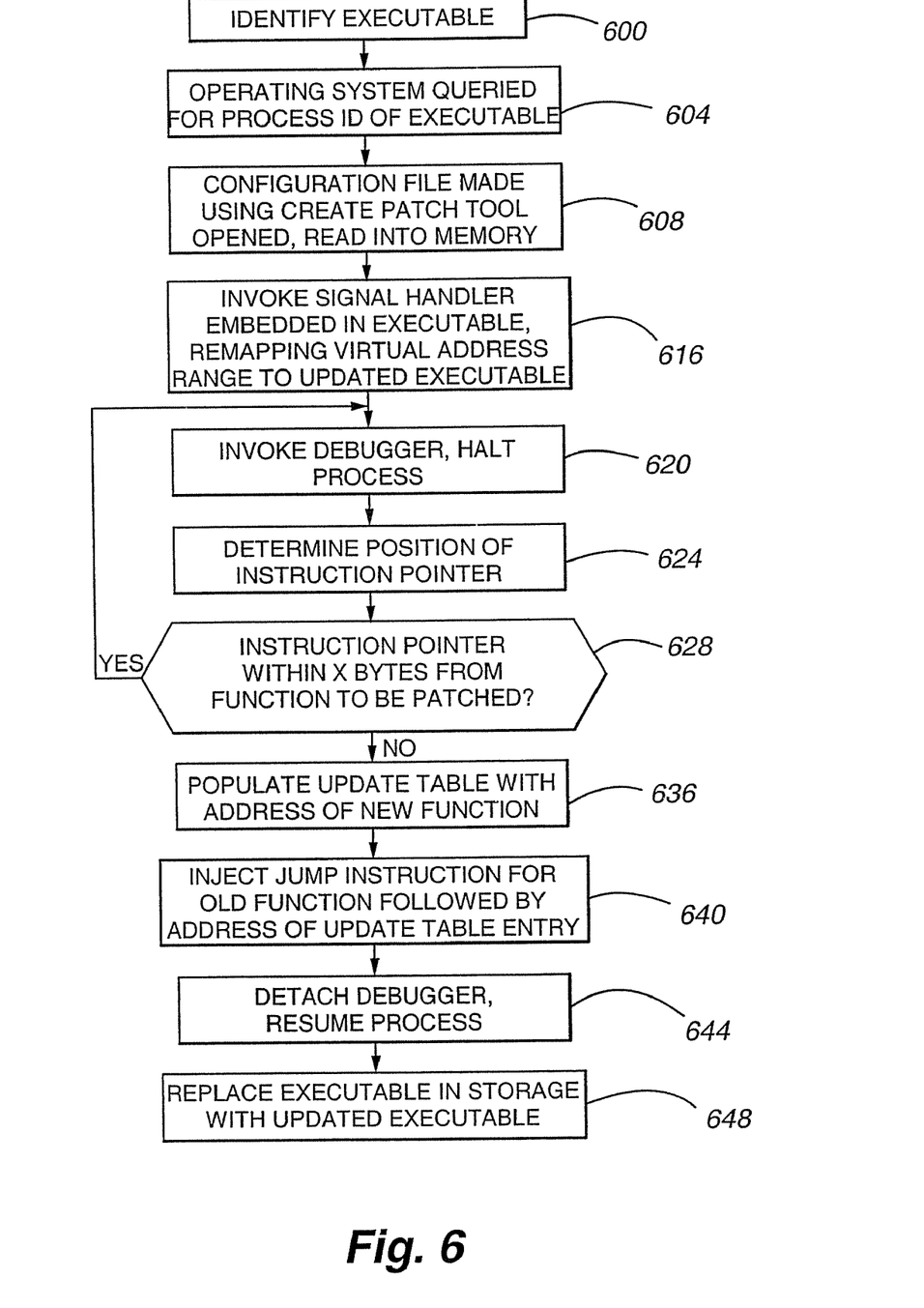
FIG. 6 is a flow chart illustrating steps taken in connection with installing a patched function in a running executable in accordance with an embodiment of the present invention.

FIG. 6 illustrates steps taken in connection with installing a patched function in a running executable. Initially, at step 600, the executable 204 to be patched is identified. Next, the operating system is queried for the process I.D. of the executable 204 (step 604). At step 608, the configuration file that was created using the create patch tool is read into memory 112. At step 616, the signal handler embedded in the executable 204 is invoked, and the virtual address range is remapped to the updated executable 204 (i.e. the executable 204 is modified to include all of the updated functions 216).

Next, a debugger utility is invoked and attached to the process (i.e., the running executable 204), thus halting execution (step 620), and the position of the instruction pointer is determined (step 624). At step 628, a determination is made as to whether the instruction pointer position is within x number of bytes from the address of the function or functions 208 to be patched. The number x is generally predetermined, and is selected so that the running process can be updated glitchlessly. As an example, the value for x may be 8 bytes.

If the instruction pointer is within x bytes of the address of the function 208 to be patched, the process returns to step 620. If the instruction pointer is not within x bytes from the function 208 to be patched, the update table 212 is populated with the address of the new function 216 (step 636). At step 640, a jump instruction is injected for the first instruction of the old function 204, followed by the address of the update table 212 entry corresponding to the new (or updated) function 216. In particular, the address of the location in memory 112 corresponding to the entry within the update table 212 containing the address corresponding to the start of the updated function 216 replaces the first instruction of the original function 208.

At step 644, the debugger is detached from the running process, allowing execution of the now updated executable 204 to resume. As can be appreciated by one of skill in the art, as a result of replacing the original function's 208 first instruction with a jump instruction sending the running process to the update table 212, which in turn directs the running process to the updated function 216, continued execution of the process results in execution of the updated function 216 in place of the original function 208. Accordingly, the running process (i.e. the copy of the executable program 204 running on the system or computer 100) is updated.

At step 648, the copy of the executable 204 maintained in storage (e.g., data storage 104) is replaced with the updated executable. Accordingly, the next time the executable program 204 is started from disk, the updated version will run. As can be appreciated from the description provided herein, an embodiment of the present invention therefore allows the stored version of the executable 204 to be updated, as well as the running version in memory 112.

Figure 7:
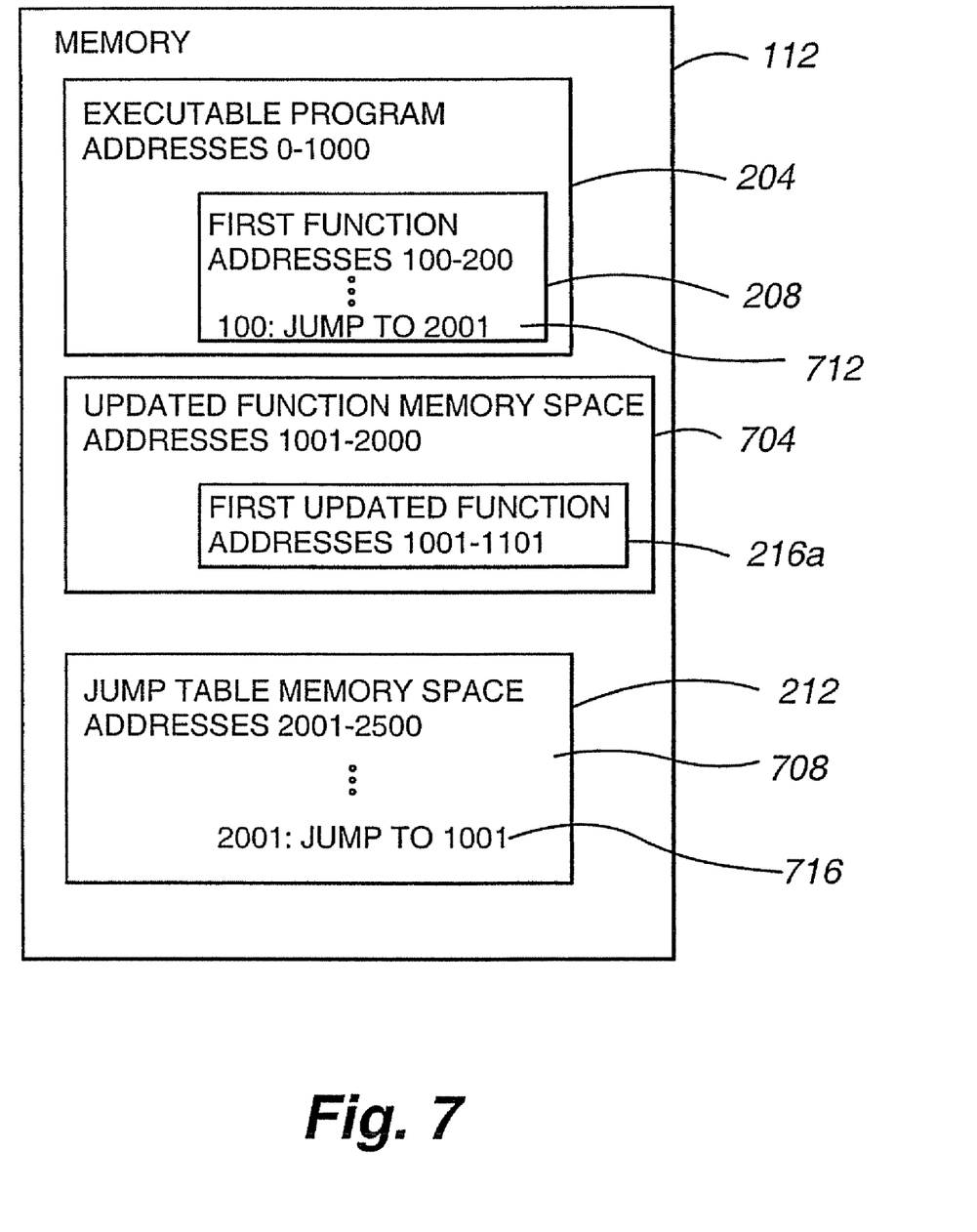
FIG. 7 is a schematic depiction of the contents of memory in accordance with an embodiment of the present invention.

With reference now to FIG. 7, the contents of at least a portion of memory 112 in accordance with an embodiment of the present invention is depicted. In particular, FIG. 7 illustrates an example allocation of memory 112. The text comprising the program instructions of an executable program 204 is shown in FIG. 7 as occupying addresses 0 to 1000 of memory 112. Included within the executable program 204 is a first function 208, illustrated as occupying addresses 100-200. A block of memory space 704 is reserved for updated functions 216, and is shown as occupying memory addresses 1001 to 2000. A first updated function 216 is shown within the updated function memory space 704 at addresses 1001 to 1101. A second block of memory space 708 comprising an update or jump 212 table is illustrated as being reserved at addresses 2001 to 2500 of the memory 112.

The example contents of memory 112 depicted in FIG. 7 additionally shows example instructions included in connection with updating a function of the executable program 204. In particular, the first function 208 is shown as including a first instruction 712 at address 100 comprising a jump instruction. In particular, the first instruction 712 is an example of a jump instruction redirecting execution to a jump table 212, such as may be injected when updating the first function 208. In the example first instruction 712, the jump is to address 2001. Address 2001 is within the memory space 708 comprising the update table 212. Furthermore, the address 2001 in FIG. 7 contains an instruction 716 to jump to address 1001. Address 1001 is, in the present example, part of the memory space 704 reserved for updated functions 216. In particular, the address space beginning at address 1001 contains the first instruction of a first updated function 216a.

Accordingly, it can be appreciated that the updating of an application (i.e. an executable program 204) in accordance with an embodiment of the present invention injects an instruction within the first instruction line 712 of a function 208 that has been updated to jump to an address corresponding to an entry within an update table 212. In particular, the jump instruction that is injected into the function 208 is to a location in the update table 212 at which an address of a first instruction of an updated function 216 is stored. Accordingly, the executable program 204 is directed to the updated function 216. Accordingly, the updated function 216 is executed in place of the original function 208. Furthermore, the patching or substitution of the original function 208 with an updated function 216 can be performed while the executable program 204 is running.

In accordance with additional embodiments of the present invention, further revisions of a patched or updated function 216 can be inserted. In accordance with an embodiment of the present invention, the process for inserting the, for example, a second generation updated function 216 is identical to the process for inserting a first generation updated function 216. That is, the first instruction of the original function 208 can be modified so that it contains an instruction to jump to an entry within an update table 212 containing the address of the second generation updated function 216. In accordance with still another embodiment of the present invention, a second generation patch can be inserted by injecting an instruction in a first generation updated function 216 to jump to an entry in an update table 212 containing the address of the first instruction of the second generation updated function 216.

The present invention can be applied to executable program code running in connection with an operating system that provides a virtual memory subsystem. The present invention allows running applications to be updated or patched, and does not require that the application be brought down. Accordingly, patches can be applied even in connection with applications providing services that must not be interrupted, or where interruption of the application services in order to update the application is undesirable.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for updating a running process, comprising:
    allocating in executable program code text first memory space operable to receive new program instructions comprising at least a first updated function;
    allocating in executable program code text second memory space operable to receive address information related to said new program instructions;
    running said executable program code;
    stopping execution of said executable program code;
    injecting a jump instruction and an address of an update table at a location in a memory containing a first instruction of a first replaced function, wherein said address of said update table contains an address of a first instruction of said first updated function;
    resuming execution of said executable program code, wherein said first updated function is called in place of said first replaced function, and wherein said executable code is updated in said memory;
    determining a first distance between a position within said executable program code text at which execution of said executable program code is stopped and an address of a first function, wherein said first function is a function to be updated; and
    in response to said first distance exceeding a predetermined amount, populating an update table stored in memory with an address of the first updated function.

2. The method of claim 1, wherein said predetermined amount is 8 bytes.

3. A computer implemented method, the method comprising:
    receiving information identifying:
        a running executable program to be patched; and
        a function to be replaced;
    accessing a symbol table in a memory for said executable program to be patched;
    obtaining from said symbol table an address of said function to be replaced;
    stopping execution by a processor of said running executable program to be patched;
    injecting in said running executable program to be patched at a location in said memory containing a first instruction of said function to be replaced a jump instruction and an address of a new function, wherein said new function is executed by said processor in place of said function to be replaced, and wherein a patched version of said executable program is created in said memory;
    resuming execution of said patched version of said executable program by said processor; and determining a number of bytes between a location within said executable program at which said executable program to be patched is stopped and an address of said function to be replaced.

4. The method of claim 3, further comprising:

in response to said determined number of bytes being at least as great as a first selected number, injecting in a stored copy of said running executable program to be patched said jump instruction and said address of said new function in place of said address of said function to be replaced, wherein a patched version of said executable program is created.

5. A system for updating executing program code, comprising: a create patch tool operable to receive information identifying an executable program to be updated and a function to be replaced;

a patch tool operable to query an operating system for a process identifier associated with said identified executable program;

a debugging utility operable to stop execution of said executable program to be updated and to determine a position of an instruction pointer associated with said executable program to be updated; and a signal handler tool operable to replace in memory an address of said function to be replaced with an address of a replacement function in response to said position of said instruction pointer being at least a predetermined distance from said address of said replacement function, wherein said replacement function is executed instead of said function to be replaced upon resuming execution of said executable program, wherein said executable program is updated.

6. The system of claim 5, wherein said signal handler is additionally operable to replace in a stored copy of said executable program an address of said function to be replaced with an address of a replacement function, wherein said stored copy of said executable program is updated.

* * * * *